(12) United States Patent
Li et al.

(10) Patent No.: US 11,748,986 B2
(45) Date of Patent: Sep. 5, 2023

(54) METHOD AND APPARATUS FOR RECOGNIZING KEY IDENTIFIER IN VIDEO, DEVICE AND STORAGE MEDIUM

(71) Applicant: Beijing Baidu Netcom Science And Technology Co Ltd, Beijing (CN)

(72) Inventors: Ruifeng Li, Beijing (CN); Lei Yuan, Beijing (CN); Xing Dai, Beijing (CN); Qinglin Qin, Beijing (CN); Zhuo Sun, Beijing (CN); Zhiqiang Liu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 268 days.

(21) Appl. No.: 17/208,684

(22) Filed: Mar. 22, 2021

(65) Prior Publication Data

US 2021/0209375 A1    Jul. 8, 2021

(30) Foreign Application Priority Data

Jun. 28, 2020    (CN) .......................... 202010599295.4

(51) Int. Cl.
*G06V 20/40* (2022.01)
*G06F 18/214* (2023.01)
*G06V 20/62* (2022.01)

(52) U.S. Cl.
CPC ............ *G06V 20/46* (2022.01); *G06F 18/214* (2023.01); *G06V 20/635* (2022.01)

(58) Field of Classification Search
CPC .. G06V 20/46; G06V 20/635; G06V 2201/09; G06V 20/41; G06F 18/214; G06T 5/30; G06T 2207/10016; G06N 3/08

USPC ......................................................... 382/157
See application file for complete search history.

(56) References Cited

U.S. PATENT DOCUMENTS

| 5,617,149 | A | 4/1997 | Lee et al. |
| 8,396,302 | B2 * | 3/2013 | Levy ...................... G06V 20/40 |
| | | | 382/218 |
| 2005/0078222 | A1 | 4/2005 | Liu et al. |
| 2013/0113999 | A1 | 5/2013 | Vashistha et al. |

(Continued)

FOREIGN PATENT DOCUMENTS

| CN | 103714314 A | 4/2014 |
| CN | 106851397 A | 6/2017 |
| JP | 2008-083894 A | 4/2008 |

(Continued)

OTHER PUBLICATIONS

Xiao et al.; License Plate Locating Method Based On Multi-feature And Device Thereof; CN 102226907; English Translation (Year: 2011).*

(Continued)

*Primary Examiner* — Neil R McLean
(74) *Attorney, Agent, or Firm* — Akerman LLP

(57) ABSTRACT

A method and an apparatus for recognizing a key identifier in a video, a device and a storage medium are disclosed. The method includes: extracting a plurality of key frames from the video; generating a mask of the key identifier by using a difference between the plurality of key frames; determining, in video frames of the video, a key identifier area image by using the mask; and recognizing the key identifier area image to obtain a key identifier category included in the video.

15 Claims, 10 Drawing Sheets

(56) References Cited

U.S. PATENT DOCUMENTS

2018/0150696 A1* 5/2018 Li .......................... G06V 20/41

FOREIGN PATENT DOCUMENTS

| JP | 2013-054430 A | 3/2013 |
|----|---------------|--------|
| KR | 10-2003-0067133 A | 8/2003 |
| KR | 10-2015-0077654 A | 7/2015 |
| KR | 10-2017-0077000 A | 7/2017 |

OTHER PUBLICATIONS

Notice of Allowance dated Dec. 20, 2022 in connection with corresponding Japanese Patent Application No. 2021-100928.
Extended European Search Report, dated Oct. 7, 2021, issued in connection with corresponding European Patent Application No. 21163943.0.
Notice of Reasons for Refusal dated May 31, 2022, issued in connection with corresponding Japanese Patent Application No. 2021-100928.
Request for the Submission of an Opinion dated Aug. 8, 2022, issued in connection with corresponding Japanese Patent Application No. 10-2021-0038213.

* cited by examiner

US 11,748,986 B2

METHOD AND APPARATUS FOR RECOGNIZING KEY IDENTIFIER IN VIDEO, DEVICE AND STORAGE MEDIUM

CROSS-REFERENCE TO RELATED APPLICATIONS

This application claims priority to Chinese Patent Application No. 202010599295.4, filed on Jun. 28, 2020, which is hereby incorporated by reference in its entirety.

TECHNICAL FIELD

The present application relates to the technical field of artificial intelligence, in particular to image recognition, and particularly to image recognition using a deep learning neural network.

BACKGROUND

In some scenarios, it is necessary to timely and effectively recognize and clean up related videos or pictures involved in some media. These media often have specific identifiers in videos posted on TV or web pages, so these specific identifiers need to be effectively recognized.

SUMMARY

The present application provides a method and an apparatus for recognizing a key identifier in a video, a device and a storage medium.

According to an aspect of the present application, there is provided a method for recognizing a key identifier in a video, and the method includes:

extracting a plurality of key frames from the video;

generating a mask of the key identifier by using a difference between the plurality of key frames;

determining, in video frames of the video, a key identifier area image by using the mask; and recognizing the key identifier area image to obtain a key identifier category included in the video.

According to another aspect of the present application, there is provided an apparatus for recognizing a key identifier in a video, and the apparatus includes:

an extraction module, configured for extracting a plurality of key frames from the video;

a generation module, configured for generating a mask of the key identifier by using a difference between the plurality of key frames;

a determination module, configured for determining, in video frames of the video, a key identifier area image by using the mask; and a recognition unit, configured for recognizing the key identifier area image to obtain a key identifier category included in the video.

According to yet another aspect of the present application, there is provided an electronic device, and the electronic device includes:

at least one processor; and a memory communicatively connected to the at least one processor; wherein, the memory stores instructions executable by the at least one processor to enable the at least one processor to implement the method for recognizing the key identifier in the video.

According to still another aspect of the present application, there is provided a non-transitory computer-readable storage medium storing computer instructions for causing a computer to perform the method for recognizing the key identifier in the video.

It is to be understood that the contents in this section are not intended to recognize the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the application and are not to be construed as limiting the application. Wherein.

DETAILED DESCRIPTION

The exemplary embodiments of the present application are described below in combination with the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

The current recognition methods for identifiers in videos are weak in fault tolerance, and the recognition effect is not ideal in scenarios with low resolution and definition.

Figure 1:
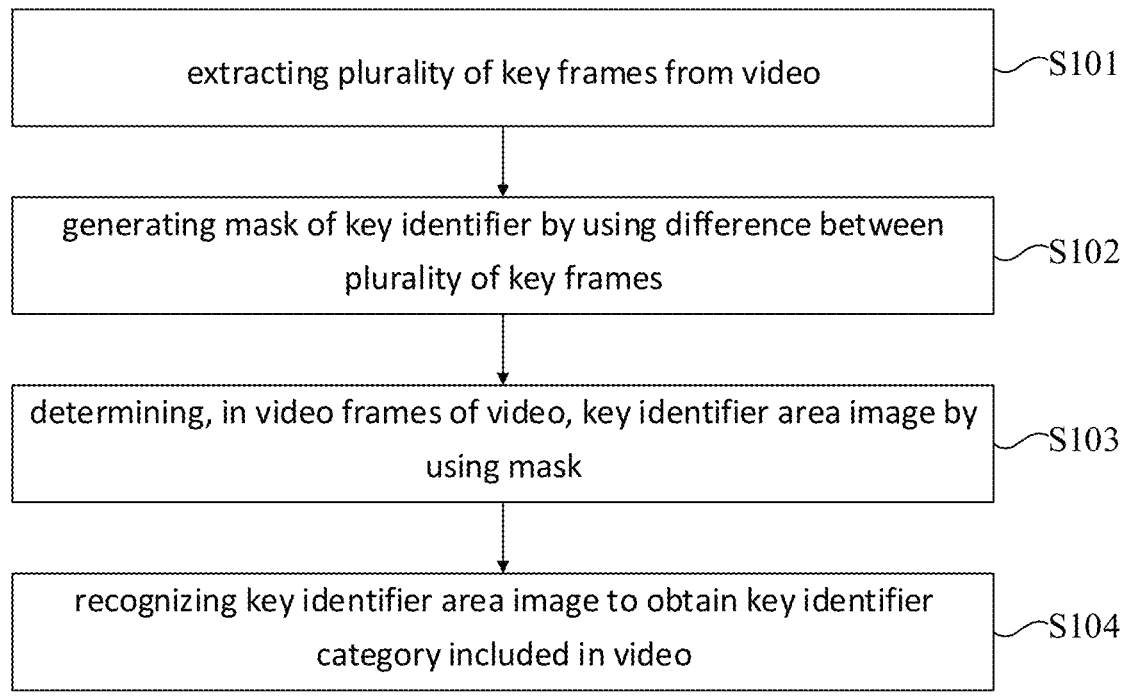
FIG. 1 is a flowchart of a method for recognizing a key identifier in a video according to an embodiment of the present application.

FIG. 1 is a flowchart of a method for recognizing a key identifier in a video according to an embodiment of the present application, and the method includes S101-S104.

S101, a plurality of key frames is extracted from the video.

S102, a mask of the key identifier is generated by using a difference between the plurality of key frames.

S103, in video frames of the video, a key identifier area image is determined by using the mask.

S104, the key identifier area image is recognized to obtain a key identifier category included in the video.

In the embodiments of the present application, the video may include several video frames, and the video frames may also be referred to as frame images. The video can be a live video or a recorded video. There may be multiple types of key identifiers in videos, for example, TV station logos in TV videos, and website logos in online videos. Some key identifiers can indicate the source of the video, some key identifiers can indicate the attribution of the video, and some key identifiers can indicate the author of the video, or other types of key identifiers. Assuming that the position where the key identifier appears in the video frames in the video generally has a certain repetitiveness, this feature can be used to recognize the key identifier.

In the embodiments of the present application, after extracting the plurality of key frames from the video, the difference between the extracted key frames can be used to obtain the mask, and then the mask is used to determine the key identifier area image, and a key identifier recognition model is used to recognize the key identifier area image.

The key identifiers in different videos may be different, for example, the TV station logos of different media may be different. A variety of images with unique key identifiers can be collected as sample images, and a key identifier recognition model can be trained. Algorithms for the key identifier recognition model can include, but are not limited to, deep learning, neural networks, etc. The key identifier area image can be recognized by the key identifier recognition model, and the key identifier category included in the image can be obtained. For example, the station logo patterns of various TV stations, such as central stations and local stations, can be collected as sample images, and a station logo recognition model can be obtained through training. The station logo recognition model is used to recognize the extracted station logo area image to obtain the station logo category of the video, such as the station logo of XX satellite TV.

In this embodiment, partial key frames of the video is used to generate the mask of the key identifier, which can improve accuracy of recognition results, has strong fault tolerance, and can reduce the amount of data processing required by recognition of the key identifier and improve the recognition speed.

Figure 2:
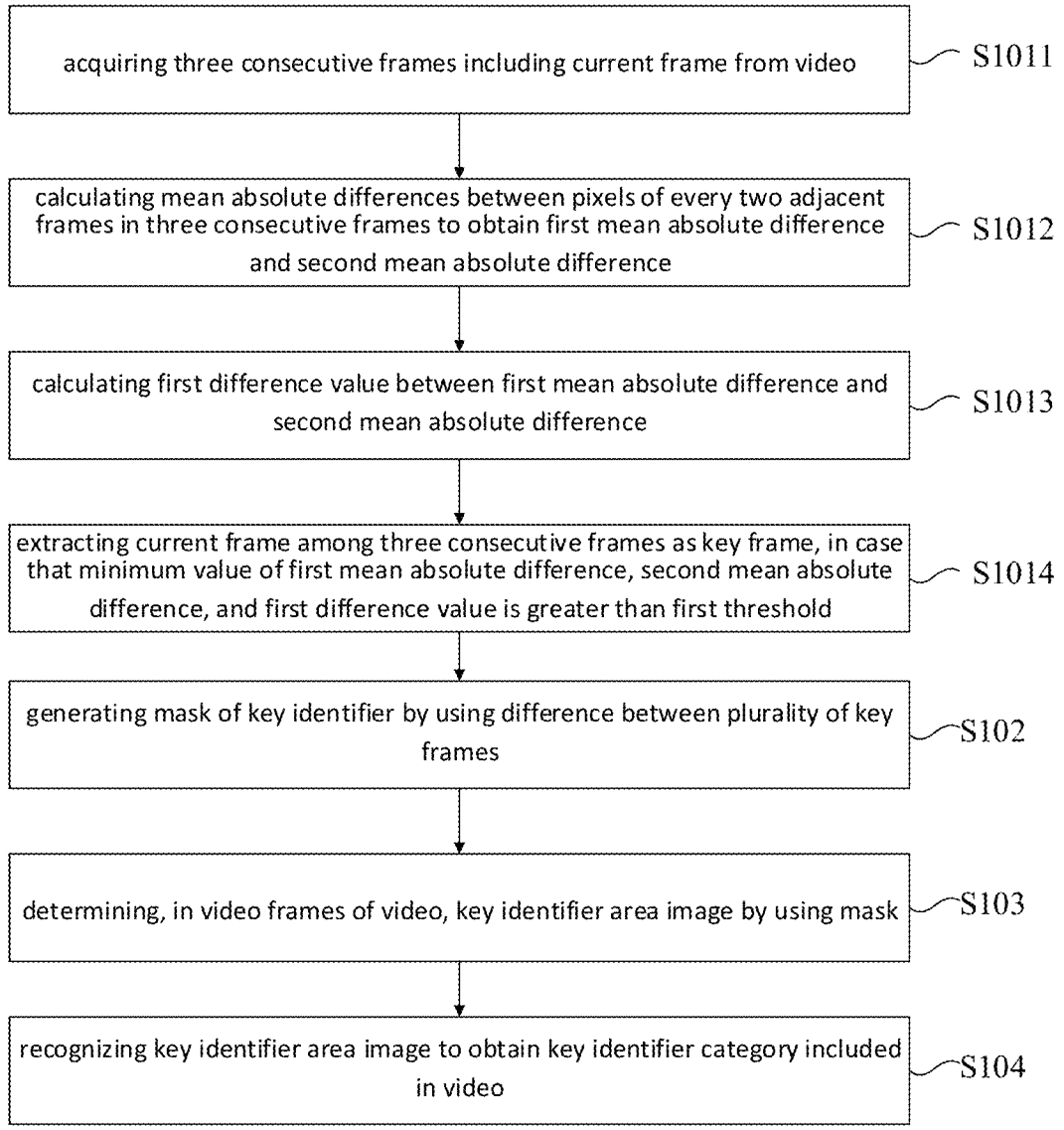
FIG. 2 is a flowchart of the method for recognizing the key identifier in the video according to another embodiment of the present application.

FIG. 2 is a flowchart of the method for recognizing the key identifier in the video according to another embodiment of the present application. The method for recognizing the key identifier in the video of this embodiment may include the steps of the foregoing embodiment. In this embodiment, at S101, the extracting the plurality of the key frames from the video, includes: extracting a key frame of a scene change in the video according to a difference between adjacent frames in the video. When the scene is changed, the pixel difference between video frames of different scenes is generally large, so the key frames extracted according to scene change can also be called scene change frames. In this embodiment, the scene key frames include the frames with large changes in the video. By taking advantage of the small change in the position of the key identifier in the scene key frames, the position of the mask of the key identifier can be obtained more accurately, thereby obtaining an accurate key identifier recognition result. It has stronger fault tolerance, and can also reduce the amount of data processing required by recognition of the key identifier and improve the recognition speed.

In one possible embodiment, the extracting the key frame of the scene change in the video according to the difference between adjacent frames in the video, includes S1011-S1014.

S1011, three consecutive frames including a current frame are acquired from the video.

S1012, mean absolute differences (MAD or MAFD for short) between pixels of every two adjacent frames in the three consecutive frames are calculated to obtain a first mean absolute difference and a second mean absolute difference.

S1013, a first difference value between the first mean absolute difference and the second mean absolute difference is calculated.

S1014, the current frame among the three consecutive frames is extracted as the key frame, in a case that a minimum value of the first mean absolute difference, the second mean absolute difference, and the first difference value is greater than a first threshold.

Exemplarily, the three consecutive frames in the video include T1, T2, and T3, where T3 is the current frame, T2 is the previous frame of the current frame, and T1 is the previous frame of T2. The first mean absolute difference between T3 and T2 is mafd1, the second mean absolute difference between T2 and T1 is mafd2, and an absolute value of the difference between mafd1 and mafd2 is the first difference value diff. If the minimum value of mafd1, mafd2, and diff is mafd2, and mafd2 is greater than the first threshold, T3 is extracted as the key frame. Similarly, other key frames such as T10, T16, T36, etc. during scene change can also be extracted from video frames. How many key frames to extract can be set flexibly. For example, the total number of extracted key frames is set to N. For another example, all the key frames during scene change are extracted from part of the video frames of the video, such as M video frames. For yet another example, all the key frames during scene change are extracted from all the video frames of the video.

In this embodiment, the mean absolute difference between the pixels of every two adjacent frames in the three consecutive frames in the video are compared to the set threshold, which can accurately and conveniently extract key frames from the video during scene change.

Figure 3:
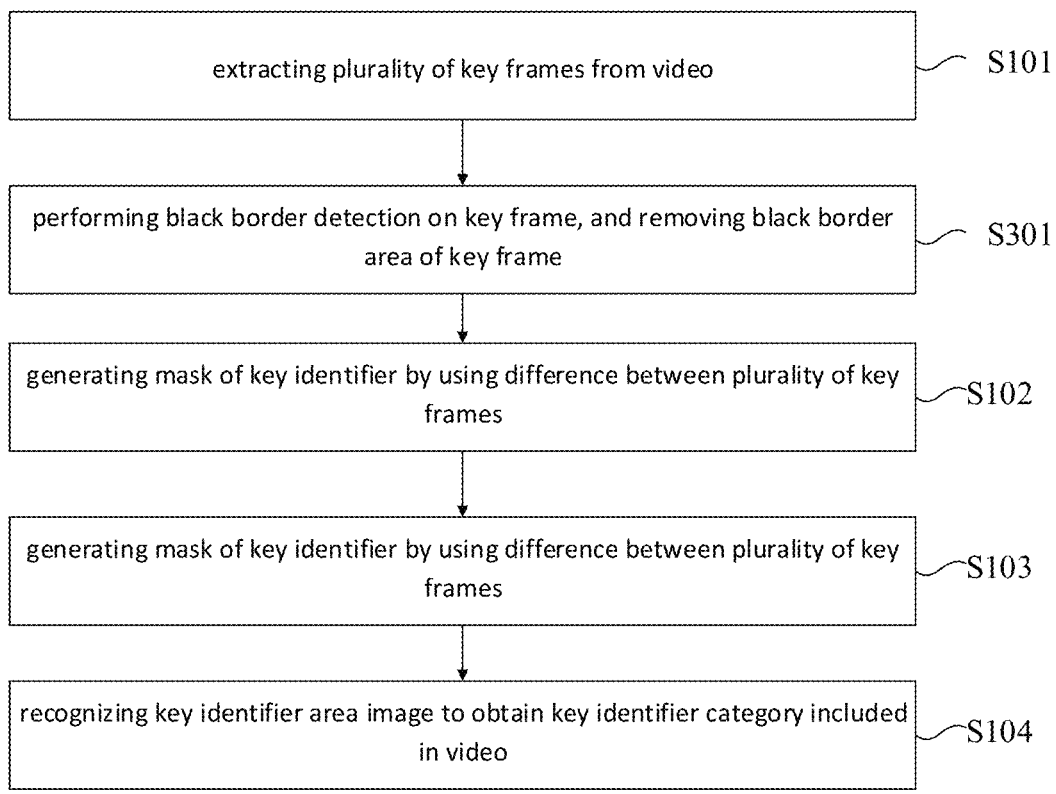
FIG. 3 is a flowchart of the method for recognizing the key identifier in the video according to yet another embodiment of the present application.

FIG. 3 is a flowchart of the method for recognizing the key identifier in the video according to yet another embodiment of the present application. The method for recognizing the key identifier in the video of this embodiment may include the steps of the foregoing embodiment. In this embodiment, the method further includes: S301 of performing a black border detection on the key frame, and removing a black border area of the key frame.

In this embodiment, after extracting the plurality of key frames from the video at S101, black border detection may be performed on each key frame and the black border area of each key frame is removed. Then S102 is executed to generate the mask of the key identifier by using the difference between the key frames after removing the black border. Some video frames will have a black border area. Pre-removal of the black border area can reduce the interference of the black border area on the generated mask of the key identifier and get a more accurate mask.

Figure 4:
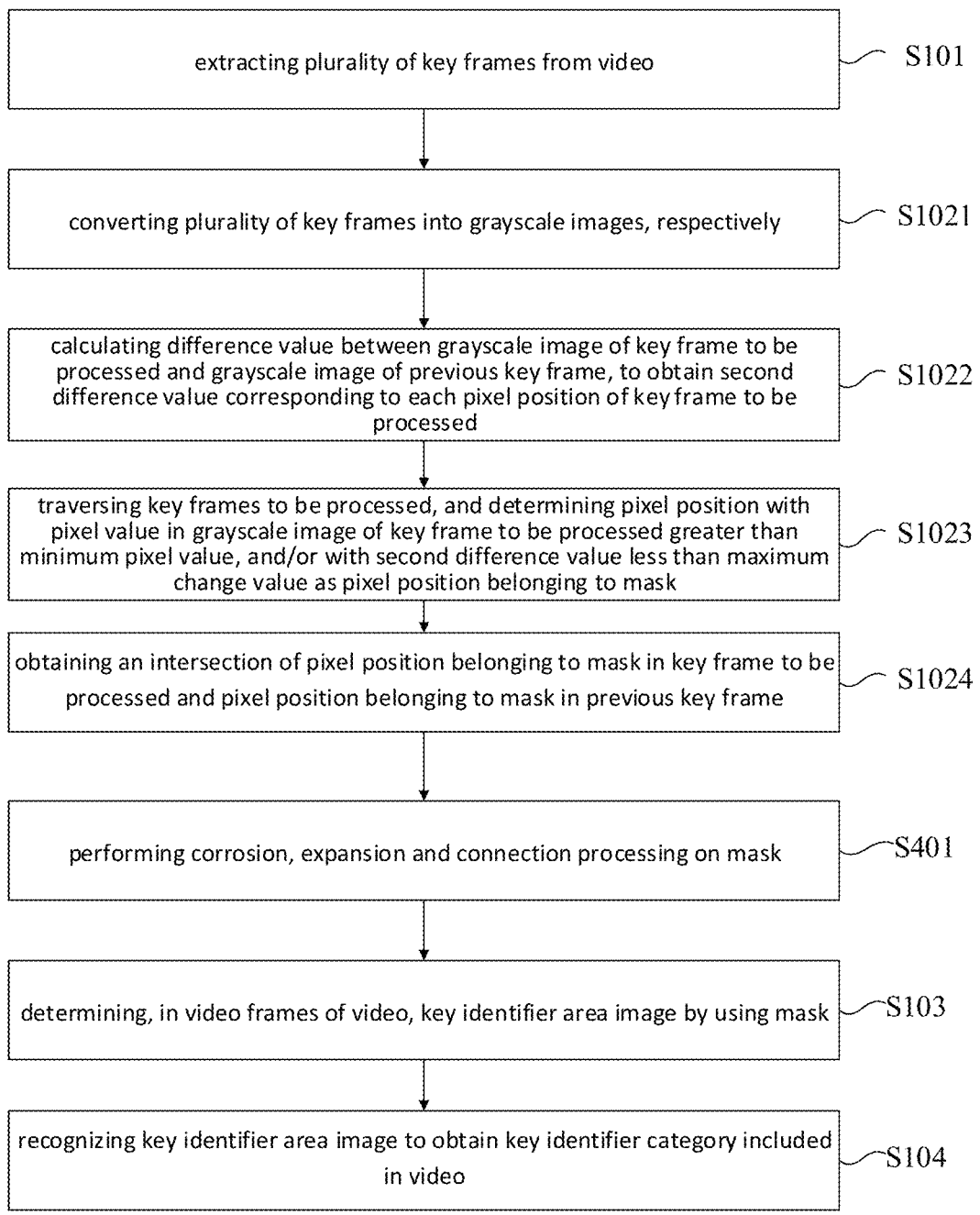
FIG. 4 is a flowchart of the method for recognizing the key identifier in the video according to still another embodiment of the present application.

FIG. 4 is a flowchart of the method for recognizing the key identifier in the video according to still another embodiment of the present application. The method for recognizing the key identifier in the video of this embodiment may include the steps of the foregoing embodiment. In this embodiment, the difference between different key frames can be used to remove the dynamic area in the key frame so as to obtain the mask. The mask may include a non-dynamic area in the key frame. At S102, the generating the mask of the key identifier by using the difference between the plurality of key frames, includes S1021-S1023.

S1021, the plurality of key frames are converted into grayscale images, respectively.

S1022, a difference value between the grayscale image of a key frame to be processed and the grayscale image of a previous key frame is calculated, to obtain a second difference value corresponding to each pixel position of the key frame to be processed.

S1023, the key frames to be processed is traversed, and a pixel position with a pixel value in the grayscale image of the key frame to be processed greater than a minimum pixel value, and/or with the second difference value less than a maximum change value, is determined as a pixel position belonging to the mask.

In the embodiment of the present application, by converting the key frame into the grayscale image, only the brightness of the pixels can be retained, and the brightness of the pixels is mainly in the range of 0-255. For example, the grayscale image of the key frame T10 to be processed is G2, and the grayscale image of the previous key frame T3 of the key frame to be processed is G1. The absolute value (0~255) of the difference between each pixel with the same position of G2 and G1 in grayscale images is calculated, and then is record as a second difference value ad.

Two thresholds, a minimum pixel value pixel_min and a maximum change value diff_max, are set. Wherein, setting the minimum pixel value can solve the problem of transparent key identifier, the transparent key identifier area has a minimum value, and setting the minimum pixel value is helpful for recognizing the transparent key identifier. Setting the maximum change value is helpful for extracting frames with large changes.

Traverse each pixel position in the key frame T10 to be processed, if the brightness of the key frame T10 to be processed in the grayscale image at the current pixel position is greater than the minimum pixel value pixel_min, and the second difference value ad at the pixel position is less than the maximum change value diff_max, it means that the pixel position has a small change, and the pixel position is determined as the pixel position belonging to the mask, for example, the value at the pixel position is set to 255. Furthermore, the values at other pixel positions not belonging to the mask in the key frame to be processed can be set to 0, that is, the area outside the mask is set to be black. The processed key frame can be called difference value frame.

The 0 and 255 in this example are only exemplary, not limitations, and other values can also be filled as long as the areas inside and outside the mask can be clearly distinguished.

In one possible embodiment, at S102 of the method, the generating the mask of the key identifier by using the difference between the plurality of key frames, further includes S1024.

S1024, an intersection of the pixel position belonging to the mask in the key frame to be processed and the pixel position belonging to the mask in the previous key frame, is obtained. In this way, a more accurate mask of the key identifier can be obtained.

In this embodiment, if the number of extracted key frames is N, the abovementioned steps of generating the mask of the key identifier can be implemented one by one according to the order of the extracted key frames. After each implementation, the current key frame to be processed and the processed difference frame can be cached to facilitate the processing of the next key frame to be processed.

In this embodiment, the key frame and the processed difference frame can be cached together, which can be called cache frame. Each key frame to be processed can be integrated with the previous cache frame, and then the intersection of the plurality of key frames is used to obtain the mask. For example, in the difference frame of the key frame T10, the pixel positions belonging to the mask include S1, S2, S3, S4, and in the difference frame of the key frame T16 after the key frame T10, the pixel positions belonging to the mask include S2, S3, S4, and S5. If an intersection of the two is taken, the pixel positions belonging to the mask include S2, S3, and S4. At this time, in the difference frame of the key frame T16, it can be updated to that the pixel positions belonging to the mask which are retained includes only S2, S3, S4, not S5. In this way, in the cache frame of the key frame T16, the key frame T16 and the updated difference frame are also retained.

In the process of traversing the key frames, the pixel position belonging to the mask in the difference frame included in the previous cache frame may be used as a basis for subsequent comparison. For example, the pixel positions belonging to the mask in the difference frame include S10, S2, S3, and S4, but in this mask calculation process of the key frame, the calculation result of S1 does not meet the two thresholds, that is, the minimum pixel value pixel_min and the maximum change value diff_max. In this situation, S1 is set to 0, and S2, S3, and S4 are retained as the pixel positions belonging to the mask.

The above-mentioned pixel position is only an example, not a limitation. In practical applications, one video frame includes a number of pixel positions, and traversing the video frame can determine whether each pixel position belongs to the mask.

In one possible embodiment, after S102 of generating a mask of the key identifier, the method further includes: S401 of performing corrosion, expansion and connection processing on the mask. As patterns of the key identifiers in the video are different, some icons may include letters, numbers, and character. Therefore, after initial determination of the pixel position belonging to the mask, some pixel positions in the mask may be set to 0, making the mask discontinuous. Performing corrosion to the mask can remove the single pixel area and thin lines in the mask. Performing expansion to the mask can make the contour of the mask larger, and repetition of the expansion for many times makes the contour larger. This is helpful to make the mask include a complete unchanged image.

In addition, connection processing can also be performed on the mask to fill holes. For example, the non-255 pixel position in the mask is converted to 255. In this way, the image of the key identifier included in the mask can be made more complete.

In one possible embodiment, S103 of determining, in video frames of the video, the key identifier area image by using the mask, includes: using the mask and the video frames of the video to perform alpha calculation, extracting at least one key identifier area image, and filling other parts of the video frames with a first pixel value. Here, alpha calculation can be called alpha blending. For example, the following Equation 1 can be used for alpha calculation.

$$p=(p0*alpha+p1*(255-alpha))/255 \quad \text{Equation 1,}$$

where, p represents the result (0~255) of alpha blending, p0 represents original image (0~255) of the video frame, p1 represents pure black image (0), and alpha represents value (0 or 255) in the mask.

In addition, other parts of the video frame except the key identifier area image are filled with the first pixel value, for example, black is indicated by being filled with 0. Of course, corresponding colors can also indicated by being filled with other values.

After the mask is determined by the difference of the key frames, the mask can be corroded and expanded for many times, and connected, and then the final mask and one or more video frames in the video are used to perform alpha calculation, to obtain the key identifier area image in each video frame. If multiple key identifiers are included in one video frame, multiple key identifier area images can be extracted from the video frame using mask. Therefore, in addition that a single key identifier can be recognized in a single recognition process, a situation where multiple key identifiers are included in the image of one video frame can also be taken into account.

Figure 5:
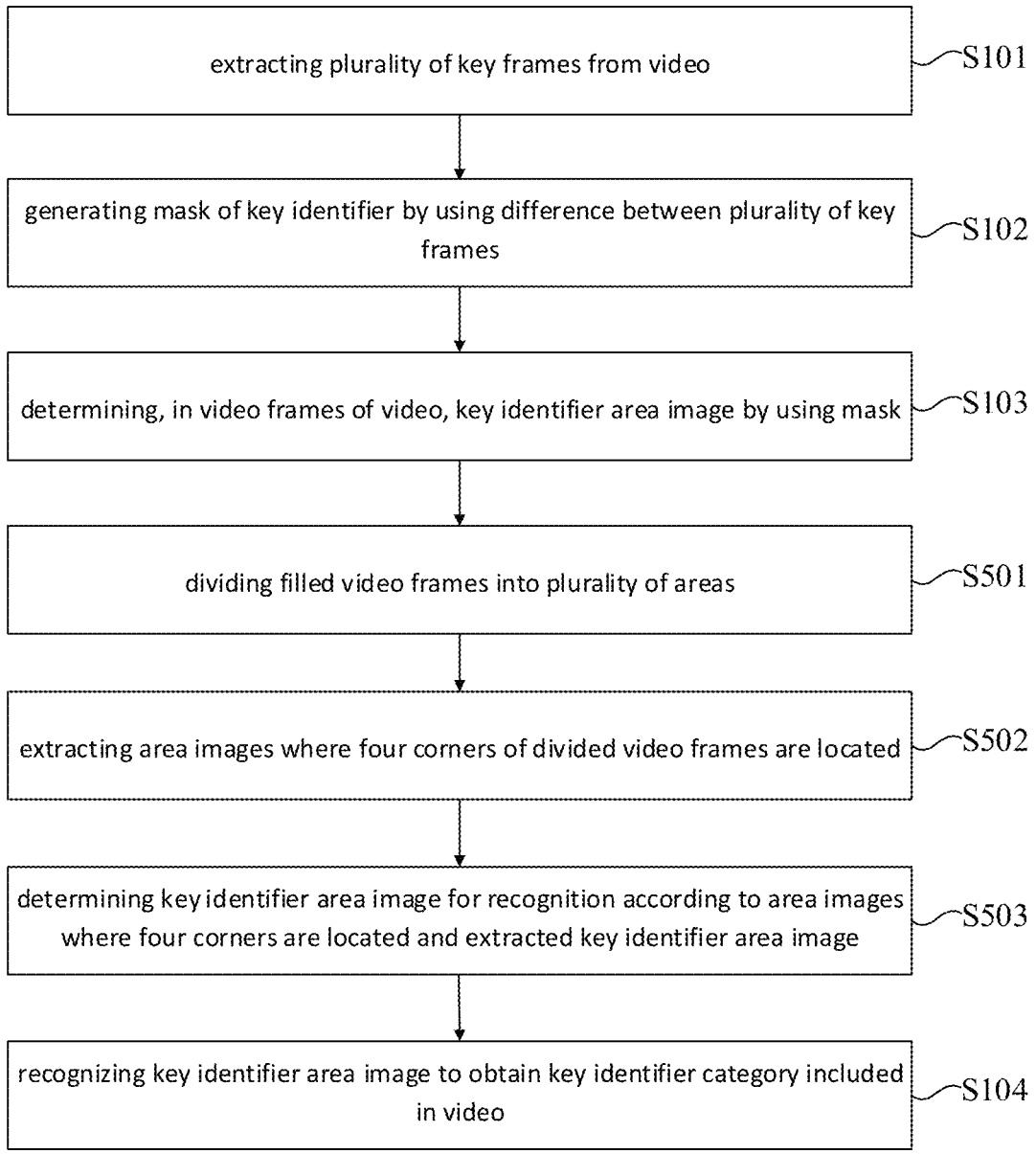
FIG. 5 is a flowchart of the method for recognizing the key identifier in the video according to still yet another embodiment of the present application.

FIG. 5 is a flowchart of the method for recognizing the key identifier in the video according to still yet another embodiment of the present application. The method for recognizing the key identifier in the video of this embodiment may include the steps of the foregoing embodiment. In this embodiment, the method further includes S501-S503.

S501, the filled video frames are divided into a plurality of areas.

S502, area images where four corners of the divided video frames are located are extracted.

S503, a key identifier area image for recognition is determined according to the area images where the four corners are located and the extracted key identifier area image.

Figure 6:
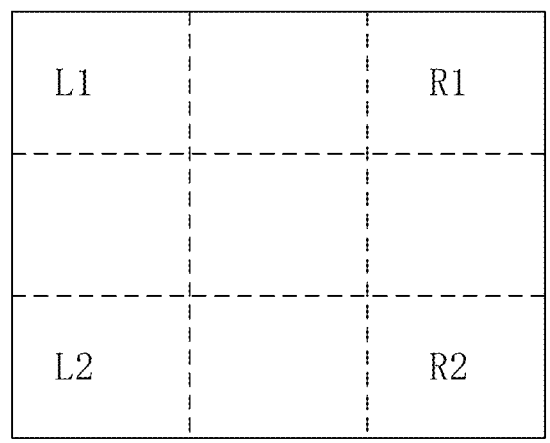
FIG. 6 is a schematic diagram of an area division in the method for recognizing the key identifier in the video according to an embodiment of the present application.

In this embodiment, the area images where the four corners are located extracted after the division can be comprehensively compared with the key identifier area image extracted by using the mask to determine which key identifier area image is finally recognized. For example, as shown in FIG. 6, the image of the video frame is divided into nine even areas using two horizontal lines and two vertical lines. The area images where the four corners are located include L1, L2, R1, and R2, there are three key identifier area images, which are located in the area images of L1, L2, and R1, and only the three key identifier area images located in the area images of L1, L2, and R1 can be recognized. The above division into nine areas is only an example and not a limitation. It can also be divided into other number of areas, for example, 12, 16, etc., which can be selected according to the screen size of the video frame and the pattern size of the key identifier. In this way, it can be applied to a situation where multiple key identifiers are included in the image of a video frame, and misrecognition of the key identifier area image can also be reduced, thereby reducing the calculation amount of the recognition algorithm and improving the recognition accuracy and speed.

Figure 7:
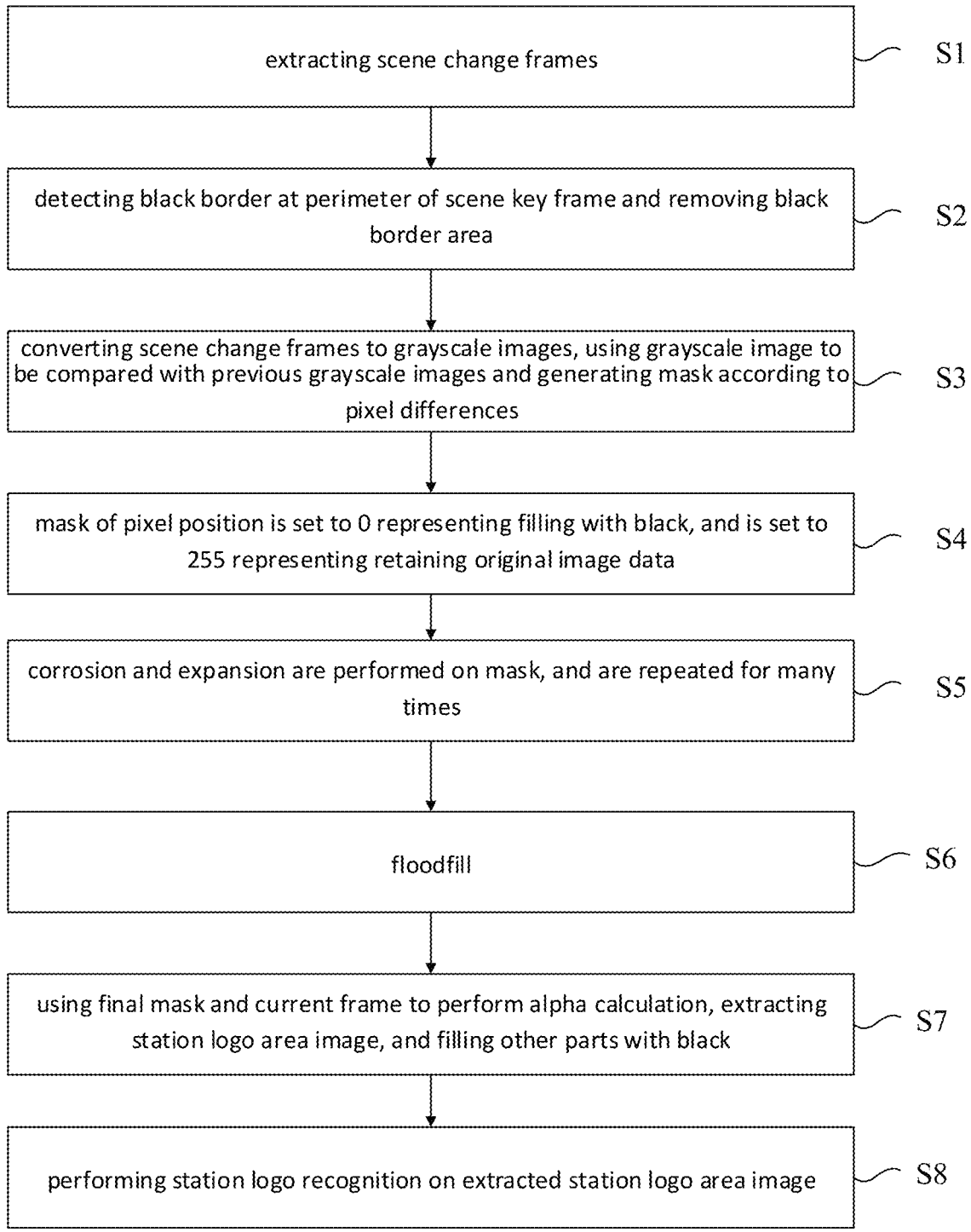
FIG. 7 is a flowchart of an application example of the method for recognizing the key identifier in the video according to an embodiment of the present application.

In an application example, taking that the key identifier extracted from the video is the station logo as an example for illustration. Since the position and pattern of the station logo (including the translucent station logo) in the video are basically fixed, and the contents of other positions will be constantly changing, the less-changing area in multiple video frames is used to generate the mask, and the complete station logo area is extracted. As shown in FIG. 7, the station logo recognizing method may include S1-S8.

S1, scene change frames are extracted.

Figure 8:
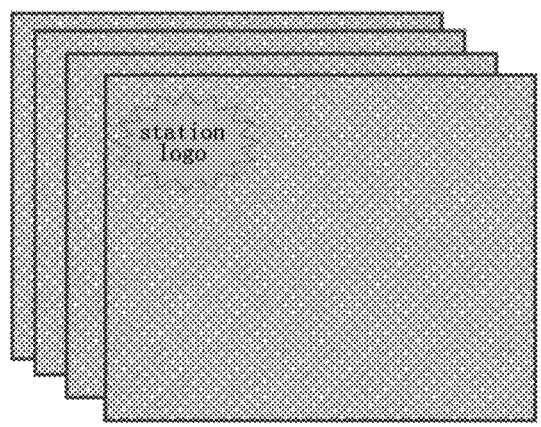
FIG. 8 is a schematic diagram of video scene change frames in the method for recognizing the key identifier in the video according to an embodiment of the present application.

For example, as shown in FIG. 8, the multimedia processing tool ffmpeg can be used to extract key frames during a scene change of the video, reducing processing time and calculation amount, and enhancing the recognition effect.

The mean absolute difference (mafd) between the current frame and the previous video frame is calculated, and the difference (diff) between two mafd is calculated. For example, three consecutive video frames T1, T2, and T3 (current frame) are used to calculate the two mafd, T3−T2 is equal to mafd1, T2−T1 is equal to mafd2, and the absolute value of mafd1−mafd2 is equal to diff. Find a minimum value between the two mafd and the diff. When the minimum value is greater than the set threshold, it is considered that a scene change has occurred in the current frame and the current frame is output.

S2, The black border at the perimeter of the scene key frame is detected and the black border area is removed.

Figure 9:
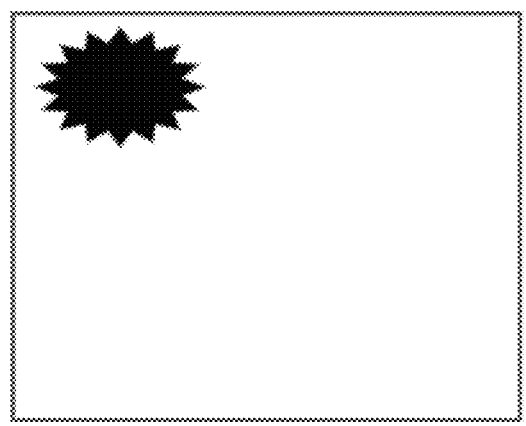
FIG. 9 is a schematic diagram of a mask generated by using an inter-frame difference in the method for recognizing the key identifier in the video according to an embodiment of the present application.

S3, the scene change frames are converted into grayscale images, for example, only the brightness is retained. A grayscale images is used to be compared with multiple previous grayscale images, and a mask is generated according to the pixel differences, as shown in FIG. 9.

Exemplary algorithm: two thresholds, a minimum pixel value (pixel_min) and a maximum change value (diff_max), are set. The pixel_min can solve the problem of transparent station logo, because the transparent station logo area has a minimum value.

The absolute value (0~255) of a difference between the current grayscale image and the previous grayscale image is referred to as ad;

Traverse each pixel position of the image, if the pixel value of the current position is greater than pixel_min and the ad corresponding to the pixel at the current position is less than diff_max, and both the previous N frames of grayscale images and ad at the corresponding position meet the above two conditions, then the mask at this position is set to be 255. The mask with the pixel position that does not meet the conditions is set to be 0.

In an example, the value of each pixel position of the mask can be calculated based on the current key frame and the previous cached frame together. The cached frame may include an original frame and a difference frame, and each cached frame is filtered according to the above rules to obtain the pixel position belonging to the mask. For each pixel position, the current position mask value that all cached frames conform to is 255, and if one does not conform, the current mask value is 0.

The difference value between multiple key frames can be used to remove the dynamic area to generate a mask, and perform corrosion and expansion operations on the mask to make the unchanged image more complete.

S4, the mask of the pixel position is set to 0 representing filling with black, and is set to 255 representing retaining the original image data.

S5, corrosion and expansion are performed on the mask, and are repeated for many times.

The single pixel area and thin lines of the mask can be removed by corrosion. The contour of the mask can be larger by expansion, and repeat it many times to make the contour further larger.

S6, floodfill, which can also be referred as connection processing, is performed.

Figure 10:
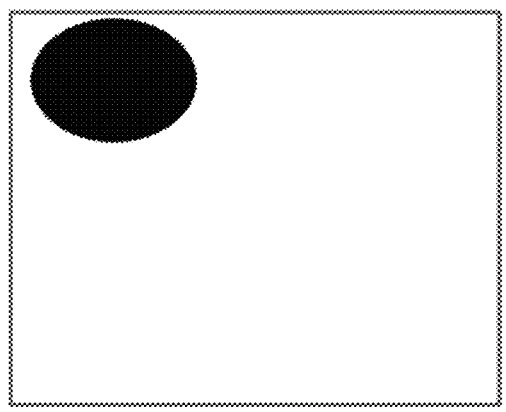
FIG. 10 is a schematic diagram of the mask after being corroded, expanded and connected in the method for recognizing the key identifier in the video according to an embodiment of the present application.

The non-255 pixel position in the area enclosed by the pixel positions with the value of 255 in the mask is converted to 255 to realize the connection in the mask. FIG. 10 shows an example of the mask after corrosion, expansion and connection processing.

S7, the final mask and the current frame are used to perform alpha calculation, the station logo area image is extracted, and other parts are filled with black. Use the mask to extract the fixed area in the video frame, and fill other parts with black. For example, fill with black outside the station logo area image to reduce false recognition.

Here, alpha calculation can be called alpha blending. For example, the equation is exemplarily as follows: $p=(p0*alpha+p1*(255-alpha))/255$, where, p represents the result (0~255) of alpha blending, p0 represents original image (0~255) of the video frame, p1 represents pure black image (0), and alpha represents value (0 or 255) in the mask. The original image can be a color image, and the color space can include YUV.

Figure 11:
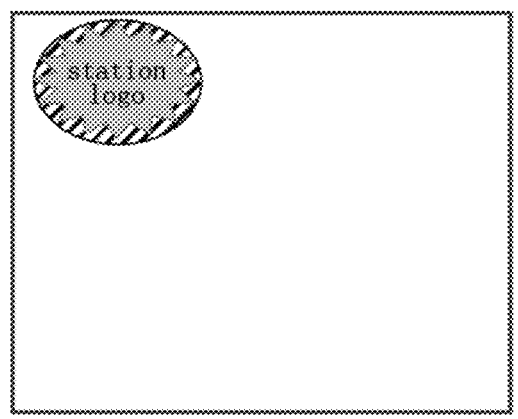
FIG. 11 is a schematic diagram of a recognized key identifier area in the method for recognizing the key identifier in the video according to an embodiment of the present application.

S8, a station logo recognition is performed on the extracted station logo area image. For example, a pre-trained station logo recognition model is used to perform the station logo recognition on the extracted station logo area image, to obtain the station logo category included in the video, as shown in FIG. 11.

In addition, the video frames can also be divided by areas, and the area images at four corners are compared with the station logo area images to comprehensively determine which station logo area images are finally recognized.

Using the above method, if there are multiple station logos in the video, including station logos that appear at the same time and at different times, they can all be included in the extracted station logo area image, and finally the categories of the multiple station logos are obtained through station logo recognition. Therefore, multiple station logos in a video can be recognized at the same time.

In the above method, the scene change frame extraction is used to find a frame with a large pixel change. Since the station logo position changes little, the station logo position can be found more accurately according to the frame with a large change. It has strong fault tolerance and can recognize the station logo under the complicated video background.

In the above method, through multi-frame image comparison and minimum pixel value filtering, transparent station logos and objects that have not moved for a long time in the video can be resolved, and false recognition can be reduced.

Figure 12:
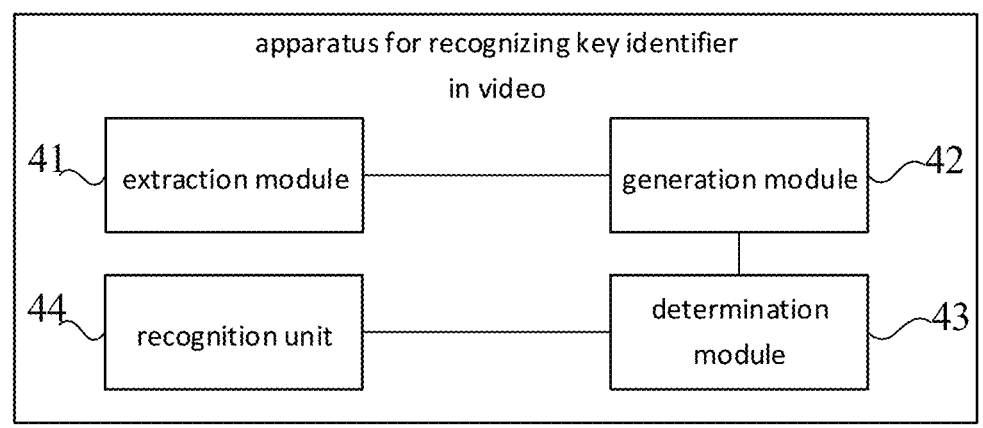
FIG. 12 is a block diagram of an apparatus for recognizing a key identifier in a video according to an embodiment of the present application.

FIG. 12 is a block diagram of an apparatus for recognizing a key identifier in a video according to an embodiment of the present application.

The apparatus may include:
an extraction module 41, configured for extracting a plurality of key frames from the video;
a generation module 42, configured for generating a mask of the key identifier by using a difference between the plurality of key frames;

a determination module 43, configured for determining, in video frames of the video, a key identifier area image by using the mask; and
a recognition unit 44, configured for recognizing the key identifier area image to obtain a key identifier category included in the video.

In one possible embodiment, the extraction module is specifically configured for extracting key frames during a scene change in the video according to a difference between adjacent frames in the video.

Figure 13:
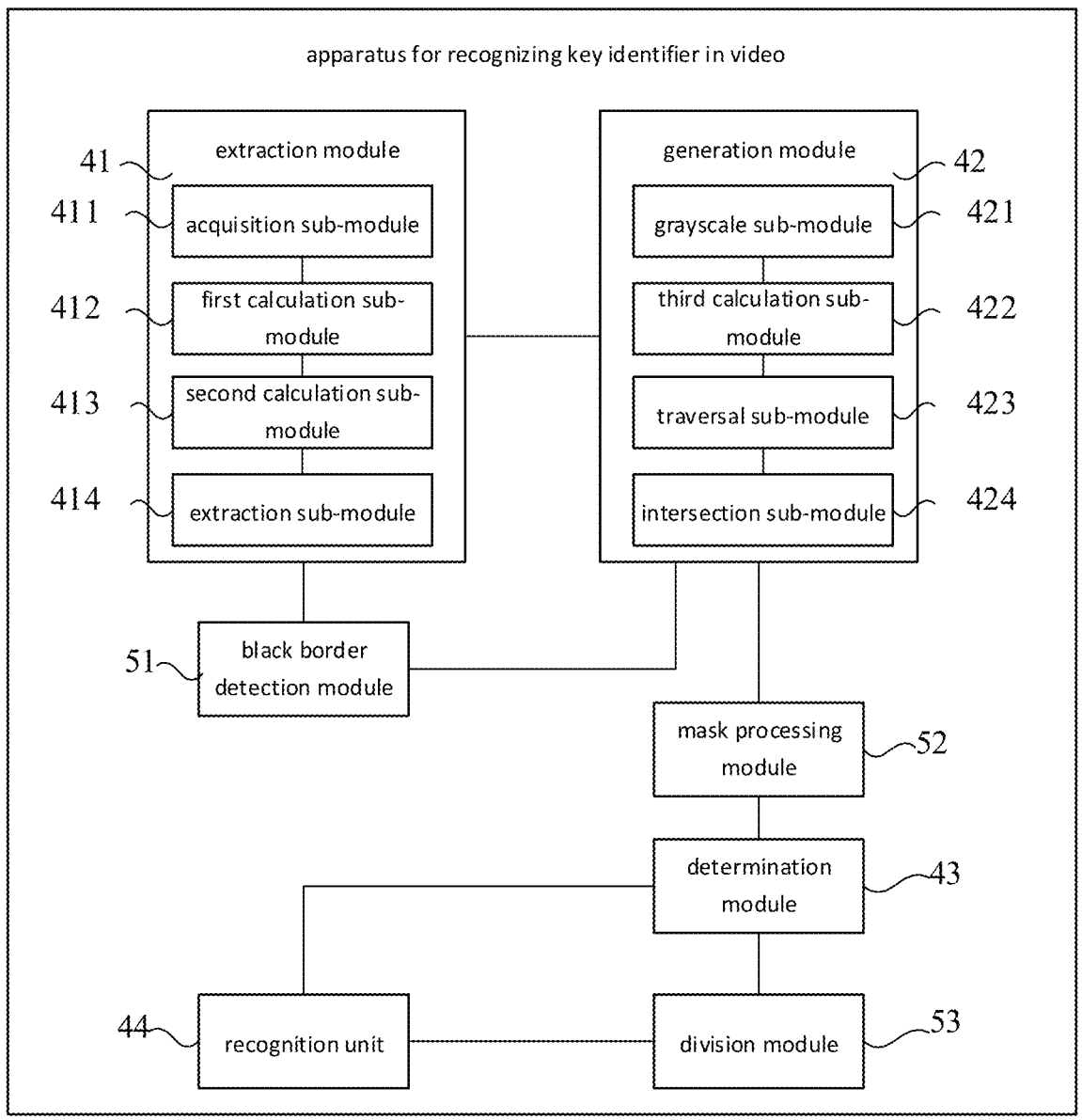
FIG. 13 is a block diagram of the apparatus for recognizing the key identifier in the video according to another embodiment of the present application.

In one possible embodiment, as shown in FIG. 13, the extraction module 41 includes:
an acquisition sub-module 411, configured for acquiring three consecutive frames including the current frame from the video;
a first calculation sub-module 412, configured for calculating mean absolute differences between pixels of every two adjacent frames in the three consecutive frames to obtain a first mean absolute difference and a second mean absolute difference;
a second calculation sub-module 413, configured for calculating a first difference value between the first mean absolute difference and the second mean absolute difference; and
an extraction sub-module 414, configured for extracting the current frame among the three consecutive frames as the key frame, in a case that a minimum value of the first mean absolute difference, the second mean absolute difference, and the first difference value is greater than a first threshold.

In one possible embodiment, the apparatus further includes:
a black border detection module 51, configured for performing a black border detection on the key frame, and removing a black border area of the key frame.

In one possible embodiment, the mask includes a non-dynamic area in the key frame, and the generation module 42 includes:
a grayscale sub-module 421, configured for converting the plurality of key frames into grayscale images, respectively;
a third calculation sub-module 422, configured for calculating a difference value between the grayscale image of a key frame to be processed and the grayscale image of a previous key frame, to obtain a second difference value corresponding to each pixel position of the key frame to be processed; and
a traversal sub-module 423, configured for traversing the key frames to be processed, and determining a pixel position with a pixel value in the grayscale image of the key frame to be processed greater than a minimum pixel value, and/or with the second difference value less than a maximum change value as a pixel position belonging to the mask.

In one possible embodiment, the generation module 42 further includes:
an intersection sub-module 424, configured for obtaining an intersection of the pixel position belonging to the mask in the key frame to be processed and the pixel position belonging to the mask in the previous key frame.

In one possible embodiment, the apparatus further includes:
a mask processing module 52, configured for performing corrosion, expansion and connection processing on the mask.

In one possible embodiment, the determination module 43 is specifically configured for using the mask and the video frames of the video to perform alpha calculation, extracting at least one key identifier area image, and filling other parts of the video frames with a first pixel value.

In one possible embodiment, the apparatus further includes:

a division module 53, configured for dividing the filled video frames into a plurality of areas; extracting area images where four corners of the divided video frames are located; and determining a key identifier area image for recognition according to the area images where the four corners are located and the extracted key identifier area image.

For the functions of the modules in the apparatuses in the embodiments of the present application, reference may be made to the corresponding descriptions in the foregoing methods, and details are not described herein again.

According to the embodiments of the present application, the present application also provides an electronic device and a readable storage medium.

Figure 14:
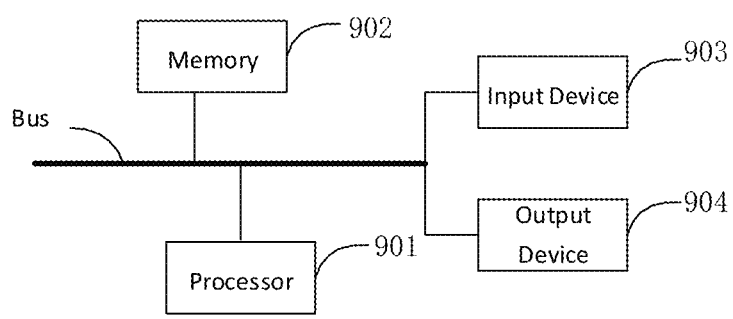
FIG. 14 is a block diagram of an electronic device for implementing the method for recognizing the key identifier in the video according to an embodiment of the present application.

FIG. 14 is a block diagram of an electronic device for implementing the method for recognizing the key identifier in the video according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present application described and/or claimed herein.

As shown in FIG. 14, the electronic device includes: one or more processors 901, memory 902, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output device, such as a display apparatus coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 14, one processor 901 is taken as an example.

The memory 902 is a non-transitory computer-readable storage medium provided by the present application. The memory stores instructions executable by at least one processor to enable the at least one processor to implement the method for recognizing the key identifier in the video provided by the present application. The non-transitory computer-readable storage medium of the present application stores computer instructions for enabling a computer to implement the method for recognizing the key identifier in the video provided by the present application.

The memory 902, as a non-transitory computer-readable storage medium, may be used to store non-transitory software programs, non-transitory computer-executable programs, and modules, such as program instructions/modules (e.g., the extraction module 41, the generation module 42, the determination module 43 and the recognition unit 44 shown in FIG. 12) corresponding to the method for recognizing the key identifier in the video according to embodiments of the present application. The processor 901 executes various functional applications of the server and data processing, i.e., achieving the method for recognizing the key identifier in the video in the above-mentioned method embodiment, by operating non-transitory software programs, instructions, and modules stored in the memory 902.

The memory 902 may include a program storage area and a data storage area, wherein the program storage area may store an application program required by an operating system and at least one function; the data storage area may store data created according to the use of the electronic device for the method for recognizing the key identifier in the video, etc. In addition, the memory 902 may include high speed random access memory, and may also include a non-transitory memory, such as at least one magnetic disk storage apparatus, a flash memory apparatus, or other non-transitory solid state memory apparatus. In some embodiments, the memory 902 may optionally include memories remotely located with respect to processor 901, which may be connected via a network to the electronic device for the method for recognizing the key identifier in the video. Examples of such networks include, but are not limited to, the Internet, intranet, local area networks, mobile communication networks, and combinations thereof.

The electronic device for the method for recognizing the key identifier in the video may further include: an input device 903 and an output device 904. The processor 901, the memory 902, the input device 903, and the output device 904 may be connected via a bus or otherwise. FIG. 14 takes a bus connection as an example.

The input device 903 may receive input numeric or character information and generate key signal inputs related to user settings and functional controls of the electronic device for the method for recognizing the key identifier in the video, such as input devices including touch screens, keypads, mice, track pads, touch pads, pointing sticks, one or more mouse buttons, track balls, joysticks, etc. The output devices 904 may include display devices, auxiliary lighting devices (e.g., LEDs), tactile feedback devices (e.g., vibration motors), and the like. The display apparatus may include, but is not limited to, a Liquid Crystal Display (LCD), a Light Emitting Diode (LED) display, and a plasma display. In some embodiments, the display apparatus may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which can receive data and instructions from, and transmit data and instructions to, a memory system, at least one input device, and at least one output device.

These computing programs (also referred to as programs, software, software applications, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic apparatus (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide an interaction with a user, the systems and techniques described herein may be implemented on a computer having: a display apparatus (e.g., a Cathode Ray Tube (CRT) or Liquid Crystal Display (LCD) monitor) for displaying information to a user; and a keyboard and a pointing apparatus (e.g., a mouse or a trackball) by which a user can provide input to the computer. Other types of devices may also be used to provide an interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication networks include: Local Area Networks (LANs), Wide Area Networks (WANs), and the Internet.

The computer system may include a client and a server. The client and the server are typically remote from each other and typically interact through a communication network. A relationship between the client and the server is generated by computer programs operating on respective computers and having a client-server relationship with each other. The server may be a cloud server, also known as a cloud computing server or cloud host. It is a host product in the cloud computing service system to solve the defects including difficult management and weak business scalability existed in traditional physical host and Virtual Private Server (VPS) services.

According to the embodiments of the application, partial key frames of the video are used to generate the mask of the key identifier, which can improve accuracy of recognition results, has strong fault tolerance, and can reduce the amount of data processing required by recognition of the key identifier and improve the recognition speed.

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of the present application.

What is claimed is:

1. A method for recognizing a key identifier in a video, comprising:
    extracting a plurality of key frames from the video;
    generating a mask of the key identifier by using a difference between the plurality of key frames;
    determining, in video frames of the video, a key identifier area image by using the mask; and
    recognizing the key identifier area image to obtain a key identifier category comprised in the video,
    wherein the extracting the plurality of key frames from the video, comprises:
    extracting a key frame of a scene change in the video according to a difference between adjacent frames in the video, and
    wherein the extracting the key frame of the scene change in the video according to the difference between adjacent frames in the video, comprises:
    acquiring three consecutive frames including a current frame from the video;
    calculating mean absolute differences between pixels of every two adjacent frames in the three consecutive frames to obtain a first mean absolute difference and a second mean absolute difference;
    calculating a first difference value between the first mean absolute difference and the second mean absolute difference; and
    extracting the current frame among the three consecutive frames as the key frame, in a case that a minimum value of the first mean absolute difference, the second mean absolute difference, and the first difference value is greater than a first threshold.

2. The method of claim 1, further comprising:
    performing a black border detection on the key frame, and removing a black border area of the key frame.

3. The method of claim 1, wherein the mask comprises a non-dynamic area in the key frame, and the generating the mask of the key identifier by using the difference between the plurality of key frames, comprises:
    converting the plurality of key frames into grayscale images, respectively;
    calculating a difference value between the grayscale image of a key frame to be processed and the grayscale image of a previous key frame, to obtain a second difference value corresponding to each pixel position of the key frame to be processed; and
    traversing the key frames to be processed, and determining a pixel position with a pixel value in the grayscale image of the key frame to be processed greater than a minimum pixel value, and/or with the second difference value less than a maximum change value as a pixel position belonging to the mask.

4. The method of claim 3, wherein the generating the mask of the key identifier by using the difference between the plurality of key frames, further comprises:
    obtaining an intersection of the pixel position belonging to the mask in the key frame to be processed and the pixel position belonging to the mask in the previous key frame.

5. The method of claim 1, further comprising:
    performing corrosion, expansion and connection processing on the mask.

6. The method of claim 1, wherein the determining, in video frames of the video, the key identifier area image by using the mask, comprises:
   using the mask and the video frames of the video to perform alpha calculation, extracting at least one key identifier area image, and filling other parts of the video frames with a first pixel value.

7. The method of claim 1, further comprising:
   dividing the filled video frames into a plurality of areas;
   extracting area images where four corners of the divided video frames are located; and
   determining a key identifier area image for recognition according to the area images where the four corners are located and the extracted key identifier area image.

8. A non-transitory computer-readable storage medium storing computer instructions for causing a computer to perform the method of claim 1.

9. An apparatus for recognizing a key identifier in a video, comprising:
   a processor and a memory for storing one or more computer programs executable by the processor,
   wherein when executing at least one of the computer programs, the processor is configured to perform operations comprising:
   extracting a plurality of key frames from the video;
   generating a mask of the key identifier by using a difference between the plurality of key frames;
   determining, in video frames of the video, a key identifier area image by using the mask; and
   recognizing the key identifier area image to obtain a key identifier category comprised in the video,
   wherein when executing at least one of the computer programs, the processor is further configured to perform operations comprising extracting a key frame of a scene change in the video according to a difference between adjacent frames in the video, and
   wherein when executing at least one of the computer programs, the processor is further configured to perform operations comprising:
   acquiring three consecutive frames including a current frame from the video;
   calculating mean absolute differences between pixels of every two adjacent frames in the three consecutive frames to obtain a first mean absolute difference and a second mean absolute difference;
   calculating a first difference value between the first mean absolute difference and the second mean absolute difference; and
   extracting the current frame among the three consecutive frames as the key frame, in a case that a minimum value of the first mean absolute difference, the second mean absolute difference, and the first difference value is greater than a first threshold.

10. The apparatus of claim 9, wherein when executing at least one of the computer programs, the processor is further configured to perform operations comprising:
    performing a black border detection on the key frame, and removing a black border area of the key frame.

11. The apparatus of claim 9, wherein the mask comprises a non-dynamic area in the key frame, and wherein when executing at least one of the computer programs, the processor is further configured to perform operations comprising:
    converting the plurality of key frames into grayscale images, respectively;
    calculating a difference value between the grayscale image of a key frame to be processed and the grayscale image of a previous key frame, to obtain a second difference value corresponding to each pixel position of the key frame to be processed; and
    traversing the key frames to be processed, and determining a pixel position with a pixel value in the grayscale image of the key frame to be processed greater than a minimum pixel value, and/or with the second difference value less than a maximum change value as a pixel position belonging to the mask.

12. The apparatus of claim 11, wherein when executing at least one of the computer programs, the processor is further configured to perform operations comprising:
    obtaining an intersection of the pixel position belonging to the mask in the key frame to be processed and the pixel position belonging to the mask in the previous key frame.

13. The apparatus of claim 9, wherein when executing at least one of the computer programs, the processor is further configured to perform operations comprising:
    performing corrosion, expansion and connection processing on the mask.

14. The apparatus of claim 9, wherein when executing at least one of the computer programs, the processor is further configured to perform operations comprising: using the mask and the video frames of the video to perform alpha calculation, extracting at least one key identifier area image, and filling other parts of the video frames with a first pixel value.

15. The apparatus of claim 9, wherein when executing at least one of the computer programs, the processor is further configured to perform operations comprising:
    dividing the filled video frames into a plurality of areas; extracting area images where four corners of the divided video frames are located; and determining a key identifier area image for recognition according to the area images where the four corners are located and the extracted key identifier area image.

* * * * *